United States Patent [19]

Kim

[11] Patent Number: 5,602,568
[45] Date of Patent: Feb. 11, 1997

[54] POINT TYPE REMOTE CONTROL APPARATUS AND THE METHOD THEREOF

[75] Inventor: Jung Y. Kim, Suwon, Rep. of Korea

[73] Assignee: Goldstar Co., Ltd., Seoul, Rep. of Korea

[21] Appl. No.: 361,822

[22] Filed: Dec. 22, 1994

[51] Int. Cl.$^6$ ........................................... G09G 5/00
[52] U.S. Cl. ................................. 345/158; 345/156
[58] Field of Search .................... 345/177, 156, 345/158, 175, 173; 341/31, 29, 30; 179/18

[56] References Cited

U.S. PATENT DOCUMENTS

| | | | |
|---|---|---|---|
| 4,711,543 | 12/1987 | Blair et al. | 345/156 X |
| 4,862,152 | 8/1989 | Milner | 340/712 |
| 4,988,981 | 1/1991 | Zimmermann et al. | 345/156 X |
| 5,053,757 | 10/1991 | Meadows | 345/173 |
| 5,126,513 | 6/1992 | Wang et al. | 178/19 |
| 5,144,594 | 9/1992 | Gilchrist | 345/177 X |
| 5,245,336 | 9/1993 | Chen et al. | 178/18 X |
| 5,428,192 | 6/1995 | Chen et al. | 178/18 X |

FOREIGN PATENT DOCUMENTS 0549177  6/1993  European Pat. Off. .

Primary Examiner—Ulysses Weldon
Attorney, Agent, or Firm—Jacobson, Price, Holman & Stern, PLLC

[57] ABSTRACT

A point type remote control apparatus and method thereof, which can directly move a point to a desired position on a display screen, and thereby select quickly from a menu and provide convenience in use. The present invention comprises a signal transmitter for transmitting a specified pulse signal towards the desired point on the display screen, and a receiver/controller having a plurality of signal receiving sensors positioned around the display screen. The receiver/controller calculates a positional coordinate of a point of the transmitter by converting the intensity differences of the pulse signals received by the signal receiving sensors into phase differences, and displays the point corresponding to the positional coordinate on the display screen. In addition, the present invention comprises a receiver/controller for counting real phase differences of each pulse signal received by the signal receiving sensors. And thereby calculating a positional coordinate of the point by analyzing synthetically count values of the real phase differences and those of the phase-converted phase differences. The signal receiving sensors are positioned at two or four corners of the display screen, so that the point is controlled to move along a straight line or on a plane within the display screen.

8 Claims, 6 Drawing Sheets

(PRIOR ART)

FIG. 3B (PRIOR ART)
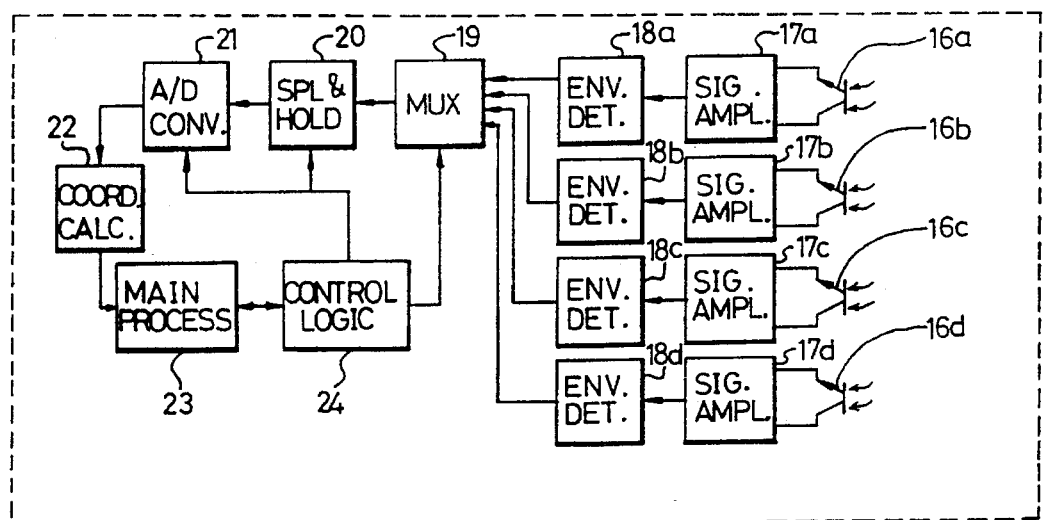
FIG. 4A —(PRIOR ART)— FIG. 4B
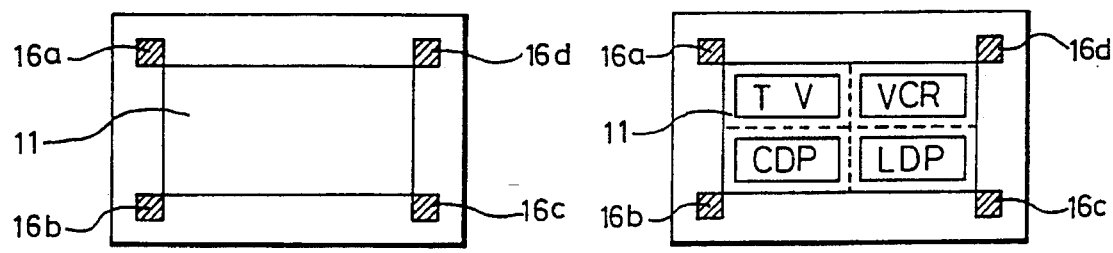
FIG. 5A —(PRIOR ART)— FIG. 5B
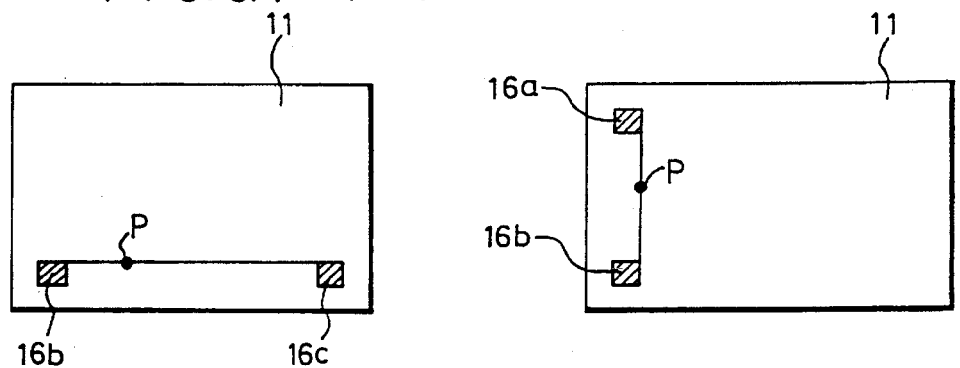

( WAVEFORMS FROM SENSORS 16a,16b,16c AND 16d )

( WAVEFORMS FROM SENSORS 16a, 16b,16c AND 16d )

POINT TYPE REMOTE CONTROL APPARATUS AND THE METHOD THEREOF

BACKGROUND OF THE INVENTION

1. Field of the Invention

The present invention relates to a remote control apparatus and method. The present invention relates in particular to a point type remote control apparatus and a method thereof which selects a certain point on the display screen corresponding to a positional coordinate calculated according to phase differences a plurality of signal receiving sensors.

2. Description of the Prior Art

Television receivers and computer systems have been currently provided with an on-screen display system or computer application software for displaying execution points on the display screen using a window system, and selecting a desired point by moving a cursor on the display screen. In such a case, the position of the cursor is controlled by a remote control or a wireless mouse.

FIG. 1 shows a structure of a conventional remote control apparatus. Referring to FIG. 1, the conventional remote control apparatus comprises a direction key (i.e., joy stick) 1 for moving a cursor to a desired point on the display screen and selecting the point, a pulse generator 2 for generating a pulse signal including a digital code corresponding to the direction of the chosen point, a carrier generator 3 for generating a carrier which modulates the pulse signal to enable it to be transmitted through the air, a current amplifier 4 for modulating the pulse signal with the carrier and amplifying the modulated pulse signal, and an infrared-transmitting diode 5 driven by the pulse signal outputted from the current amplifier 4 for transmitting infrared rays into the air.

The conventional remote control apparatus has also been provided with a signal receiving sensor 6 for receiving the transmitted infrared rays, a signal amplifier 7 for amplifying the infrared ray signals received by the signal receiving sensor 6, an envelope detector 8 and a comparator 9 for removing the carrier from the output signal of the signal amplifier 7 to reproduce only the pulse signal, and a pulse analyzer 10 for analyzing a direction code from the reproduced pulse signal to obtain information about the point direction.

In the conventional remote control apparatus constructed as described above, if a user selects a desired direction by utilizing the joy stick 1, the pulse generator 2 generates a pulsed digital code signal corresponding to the desired direction of the point. This pulse signal enters the current amplifier 4 with a carrier generated from the carrier generator 3 to be modulated and amplified, and is then applied to the infrared-transmitting diode 5. Accordingly, the infrared-transmitting diode 5 transmits the infrared rays into the air.

The transmitted infrared rays enter the signal receiving sensor 6 and are amplified by the signal amplifier 7 in order to compensate for transmission loss through the air. The carrier is removed from the amplified signal by the envelope detector and the comparator 9, so that only the pulse signal is extracted. The extracted pulse signal is analyzed into a code of pulse form by the pulse analyzer 10, and thus information about the moving direction of the point can be obtained according to the analyzed code. Accordingly, if a user operates the Joy stick continuously, the above operation is repeatedly performed and thus information about the direction of the point can be obtained at regular intervals. Therefore, it is possible to move the point to any desired position on the display screen.

However, such conventional remote control apparatus has the drawback that it is inconvenient to manipulate the joy stick 1, which must be continuously operated in order to move the cursor to the desired position on the display screen. Moreover, if a user intends to move the point to a distant position, this requires significant moving time. In addition, due to the directivity of a receiving sensor, the joy stick 1 should be manipulated only when the transmitter 40 is exactly focused on the position of the signal receiving sensor 6.

Meanwhile, a point type remote control apparatus for improving the disadvantage of the conventional point type remote control apparatus is disclosed in the applicant's prior application of the U.S. patent application 08/093,350 filed on the Jul. 16, 1993.

Referring to FIG. 2 and FIG. 3A, the conventional remote control apparatus comprises a transmitter 40 and a receiver/controller 50.

The transmitter 40 comprises a switch SW, a pulse generator 12 for generating a pulse signal whale the switch SW is turned on, a carrier generator 13 for generating a carrier which modulates the pulse signal to allow the pulse signal to be radiated through the air, a current amplifier 14 modulating and amplifying the pulse signal with the carrier, and an infrared-transmitting diode 15 driven by the output of the current amplifier 14 for transmitting the infrared pulse signal.

The receiver/controller 50 comprises signal receiving sensors 16a to 16d positioned at four corners of the display screen 11 for receiving the pulse signal transmitted from the infrared-transmitting diode 15, signal amplifiers 17a to 17d for amplifying the weak pulse signals received by each of the signal receiving sensor 16a to 16d, envelope detectors 18a to 18d for removing the carrier from the output signals of the respective signal amplifiers 17a to 17d and providing level signals corresponding to the intensities of the pulse signals received by the respective signal receiving sensors 16a to 16d, a multiplexer 19, a sample and holder 20, and an analog/digital (A/D) converter 21 connected in series for converting the output levels of the envelope detectors 18a to 18d into digital values, a coordinate calculator 22 receiving the output of A/D converter 21 as an input thereof for calculating the present coordinate on the display screen pointed by the transmitter 40, a main processor 23 for recognizing the point corresponding to the coordinate calculated by the coordinate calculator 22 and displaying it on the display screen, and a control logic section 24 for controlling the timing for driving the above elements 19, 20, 21 and 23.

The operation and efficacy of the apparatus constructed as above will be explained in detail.

With reference to FIG. 3B, the signal receiving sensors 16a to 16d are respectively positioned at four corners of the display screen 11 as shown in FIG. 4A, which enables the point to move on a two-dimensional plane.

If the switch Sw is turned on while the transmitter 40 points to a desired position on the display screen 11, the pulse generator 12 generates a pulse signal until the switch SW is turned off. The pulse signal then enters the current amplifier 14 with a carrier generated from the carrier generator 13. Then, the current amplifier 14 modulates the pulse signal with the carrier and amplifies the modulated pulse signal to apply to the infrared-transmitting diode 15 for transmitting the pulse signal and the carrier.

The amplified pulse signal is transmitted into the air by the infrared-transmitting diode 15 and is received by the signal receiving sensors 16a to 16d in the receiver/controller 50. At this time, the intensities of each pulse signal received by the signal receiving sensors 16a to 16d vary according to the direction of the transmitter 40, that is, according to the angle between the transmitter 40 and each of the signal receiving sensor 16a to 16d.

The pulse signals received by the signal receiving sensors 16a to 16d as stated above are respectively amplified by the signal amplifiers 17a to 17d and then enter the envelope detectors 18a to 18d respectively. Then, the envelope detectors 18a to 18d remove the carrier from the amplified signals and provide envelope-detected signals corresponding to the intensities of the pulse signals respectively received by the signal receiving sensors 16a to 16d.

The envelope-detected signals provided from the envelope detectors 18a to 18d successively pass through the multiplexer 19, the sample and holder 20, and the A/D converter 21 to be converted into a digital value and then enter the coordinate calculator 22. Accordingly, the coordinate calculator 22 calculates the currently pointed position coordinate on the display screen 11.

FIG. 4B shows an exemplified display screen for selecting from a menu when the above-described apparatus is embodied in an audio/video system. As shown in FIG. 4B, if the transmitter 40 used to direct a desired machine portion, where a machine selection menu composed of a television receiver (TV), a video cassette recorder (VCR), a compact disc player (CDP) and a laser disc player (LDP) is displayed on the screen 11 divided into four portions, one signal receiving sensor nearest to the portion pointed by the transmitter 40 among the signal receiving sensors 16a to 16d positioned at four corners of the display screen 11 receives the strongest signal. Accordingly, the coordinate calculator 22 calculates the position coordinate corresponding to the machine portion pointed to by the transmitter 40.

Meanwhile, if the display screen 11 is divided into eight or more portions due to an increase of menu functions, the coordinate calculator 22 calculates the position coordinate on the basis of one signal receiving sensor whose signal level is the highest among those of the signal receiving sensors 16a to 16d. For example, if the signal receiving sensor 16b in FIG. 4B has the highest signal level, the signal receiving sensor 16d has the lowest signal level. Accordingly, by utilizing the received signal levels of the respective signal receiving sensors 16a and 16c with respect to the signal receiving sensor 16b, excepting the signal sensor 16d, the position coordinate on the display screen 11 can be calculated by the coordinate calculator 22.

The main processor 23 displays the current point on the display screen 11 by matching the position coordinate calculated by the coordinate calculator 22 to the display screen 11.

The timing for driving the above elements 19, 20, 21 and 23 in the receiver/controller 50 is controlled by the control logic section 24.

Meanwhile, FIGS. 5A and 5B show different arrangements of the signal receiving sensors which are suitable to move a point along a one-dimensional straight line on the display screen 11, rather than on a two-dimensional plane. That is, as shown in FIGS. 5A and 5B, a pair of signal receiving sensors 16b and 16c, or 16a and 16b is positioned at the right and left or the top and bottom of the display screen 11 when it is necessary to move a point P in a straight line between the right and left or the top and bottom of the display screen 11. Therefore, the point P can be moved in the desired direction according to the differences in intensities of signals received by the pair of signal receiving sensors.

The operation of this modification is the same as that of the apparatus illustrated in FIGS. 4A and 4B.

However, the conventional point type remote control apparatus so far described determines the point corresponding to the positional coordinate calculated by the coordinate calculator 22, where the calculated coordinate is matched to the strongest signal achieved by comparing the only signal intensities received by the signal receiving sensors 16a to 16d positioned around the display screen 11. Thus, the conventional point type remote control apparatus those has the disadvantage that an erroneous determination of the coordinate might be made owing to a deviation of the radiation angle or distance between the transmitter 40 and the signal receiving sensors 16a to 16d.

SUMMARY OF THE INVENTION

The present invention has been made to overcome the problems of the prior art.

It is an object of the present invention to provide a point type remote control apparatus which can directly move a point to a desired position on a display screen, thereby quickly selecting from a menu and avoiding inconvenience in use.

In one aspect of the present invention, there is provided a point type remote control apparatus, which is for selecting a point existing on a display screen, comprising:

a transmitting means for transmitting a specified pulse signal towards a target point on the display screen;

a receiving means which includes a plurality of signal receiving sensors positioned around the display screen;

a signal processing means for performing a phase conversion according to the intensities of the pulse signals received by said signal receiving sensors by using a triangular wave synchronized with the signals received by said signal receiving sensors, and counting phase differences of the respective phase-converted pulse signals;

a coordinate calculating means for calculating a positional coordinate on the display screen corresponding to the most intense pulse signal from the respective phase differences counted at said signal processing means; and a control means for recognizing the point on the display screen corresponding to the positional coordinate calculated by said coordinate calculating means, and displaying recognition of the point.

In another aspect of the present invention, there is provided a point type remote control method, which for selecting a point existing on a display screen, comprising the steps of:

(a) transmitting a specified pulse signal towards a target-point on the display screen;

(b) receiving the pulse signal respectively at several locations around the display screen;

(c) converting intensity differences of the received pulse signals into phase differences, and counting the phase differences of the phase-converted signals;

(d) calculating a positional coordinate on the display screen corresponding to the most intensive pulse signal from the respective counted phase differences of the phase-converted signals; and (e) recognizing the point corresponding to the calculated positional coordinate and displaying the recognition of the point.

BRIEF DESCRIPTION OF THE DRAWINGS

The above object and other advantages of the present invention will become more apparent by describing the preferred embodiments thereof with reference to the accompanying drawings in which:

FIG. 3B is a block diagram of the receiver/controller of the apparatus in FIG. 2.

FIGS. 4A and 4B show an arrangement of the signal receiving sensors around the display screen according to the apparatus in FIG. 2.

FIGS. 5A and 5B show a different arrangement of the signal receiving sensors around the display screen according to the apparatus in FIG. 2.

DETAILED DESCRIPTION OF THE PREFERRED EMBODIMENT

Figure 1:
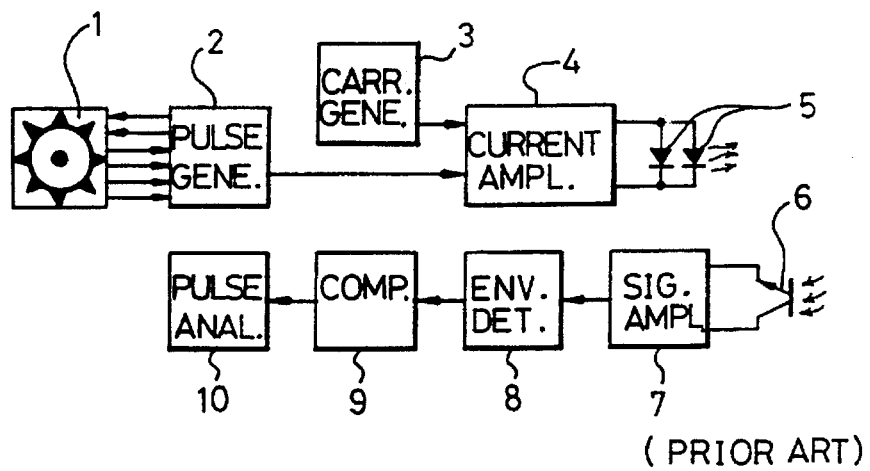
FIG. 1 is a block diagram of one conventional remote control apparatus utilizing infrared rays.
Figure 2:
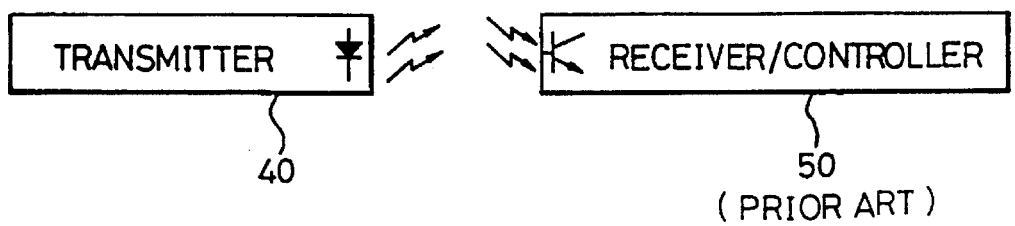
FIG. 2 is a schematic block diagram of a transmitter and a receiver/controller of the point type remote control apparatus according to the conventional apparatus.
Figure 3A:
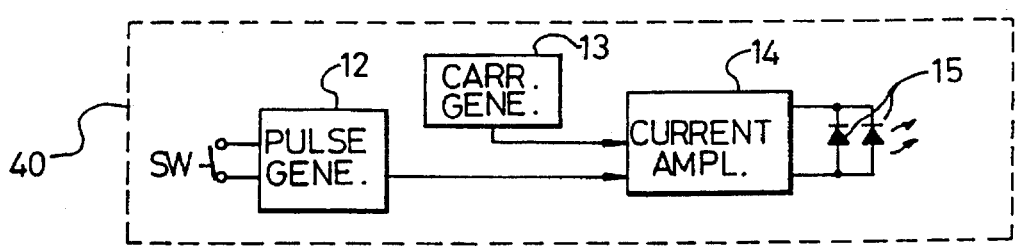
FIG. 3A is a block diagram of the transmitter of the apparatus in FIG. 2.
Figure 6:
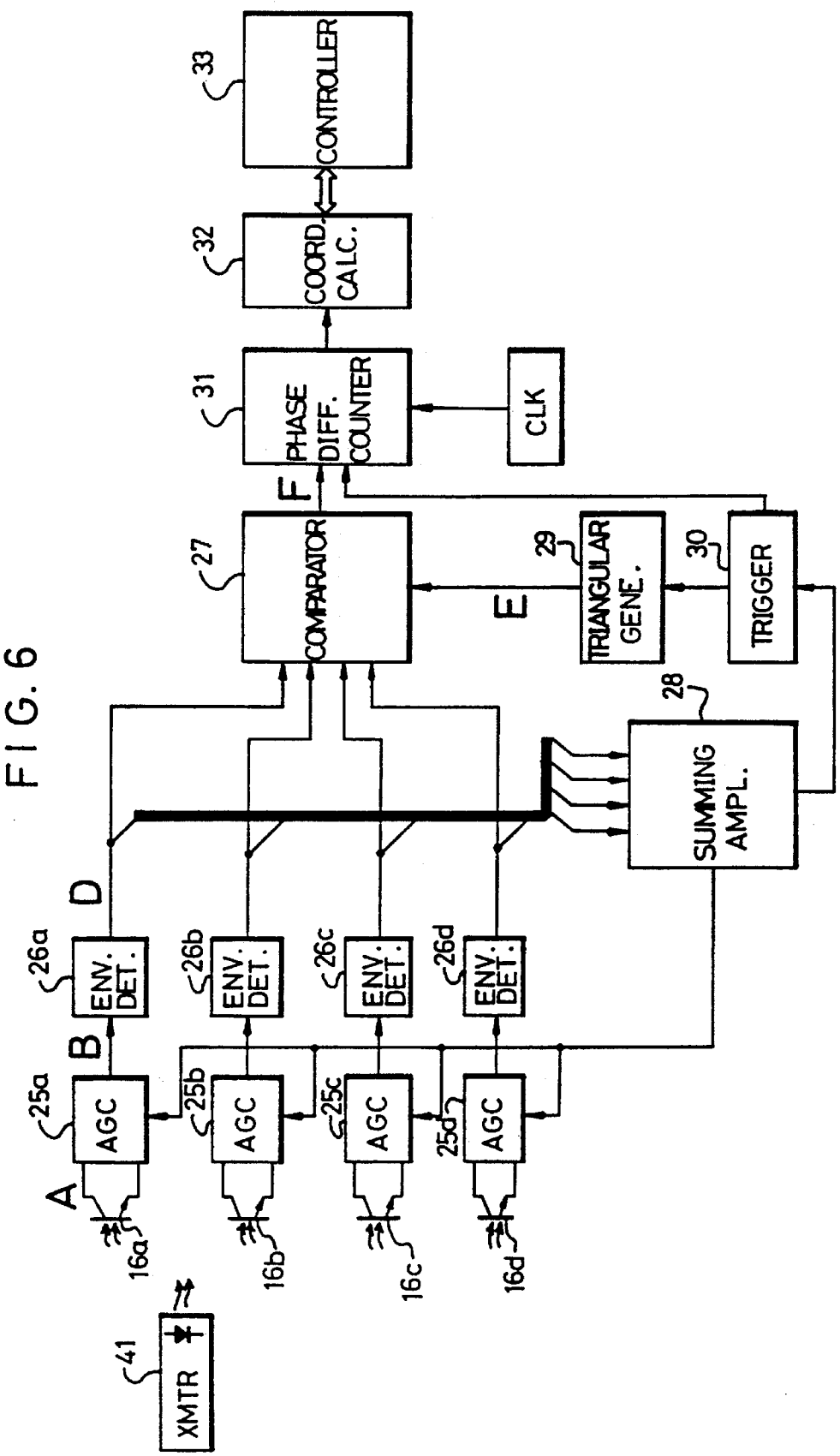
FIG. 6 is a block diagram of one preferred embodiment of the present invention.

FIG. 6 is a block diagram of one preferred embodiment of the point type remote control apparatus according to the present invention.

Referring to FIG. 6, the point type remote control apparatus comprises a transmitter 41, four signal receiving sensors 16a to 16d for receiving a specified pulse signal transmitted from the transmitter 41, automatic gain controllers 25a to 25d (hereinafter referred to as AGC) for adjusting uniformly the level of pulse signals received by the respective signal receiving sensors 16a to 16d, envelope detectors 26a to 26d for extracting the original pulse signal by removing a carrier from the output of the AGCs 25a to 25d, a summing-amplifier 28 for summing-amplifying the envelope-detected signal outputted from each of the envelope detector 25a to 25d and thereafter applying the summing-amplified pulse signal to the AGCs 25a to 25d as a reference level, a trigger circuit 30 for generating a trigger signal towards an undermentioned triangular wave generator 29 with the trigger signal synchronized with summing-amplified signal from the summing-amplifier 28, a triangular wave generator 29 for generating a triangular wave synchronized with the trigger signal, a comparator 27 for performing a phase conversion by both the envelope-detected signal from the respective envelope detectors 26a to 26d and the triangular wave from the triangular wave generator 29, a phase difference counter 31 for counting a phase difference of the respective phase-converted signals from the comparator 27, a coordinate calculator 32 for calculating a positional coordinate corresponding to the strongest signal among those of the signal receiving sensors 16a to 16d positioned around the display screen by means of the phase differences of the phase-converted signals counted at the phase difference counter 31, and a controller 33 for controlling a cursor's move on the point of positional coordinate calculated by the coordinate calculator 32 and selecting the point thereof.

The operation of the present invention constructed as above will be described with reference to FIGS. 6, 8 and 9. Only one signal receiving sensor 16a out of four 16a to 16d will be explained for convenience sake. The operation of the signal receiving sensors 16b to 16d is analogous to that of the signal receiving sensor 16a.

Figure 8:
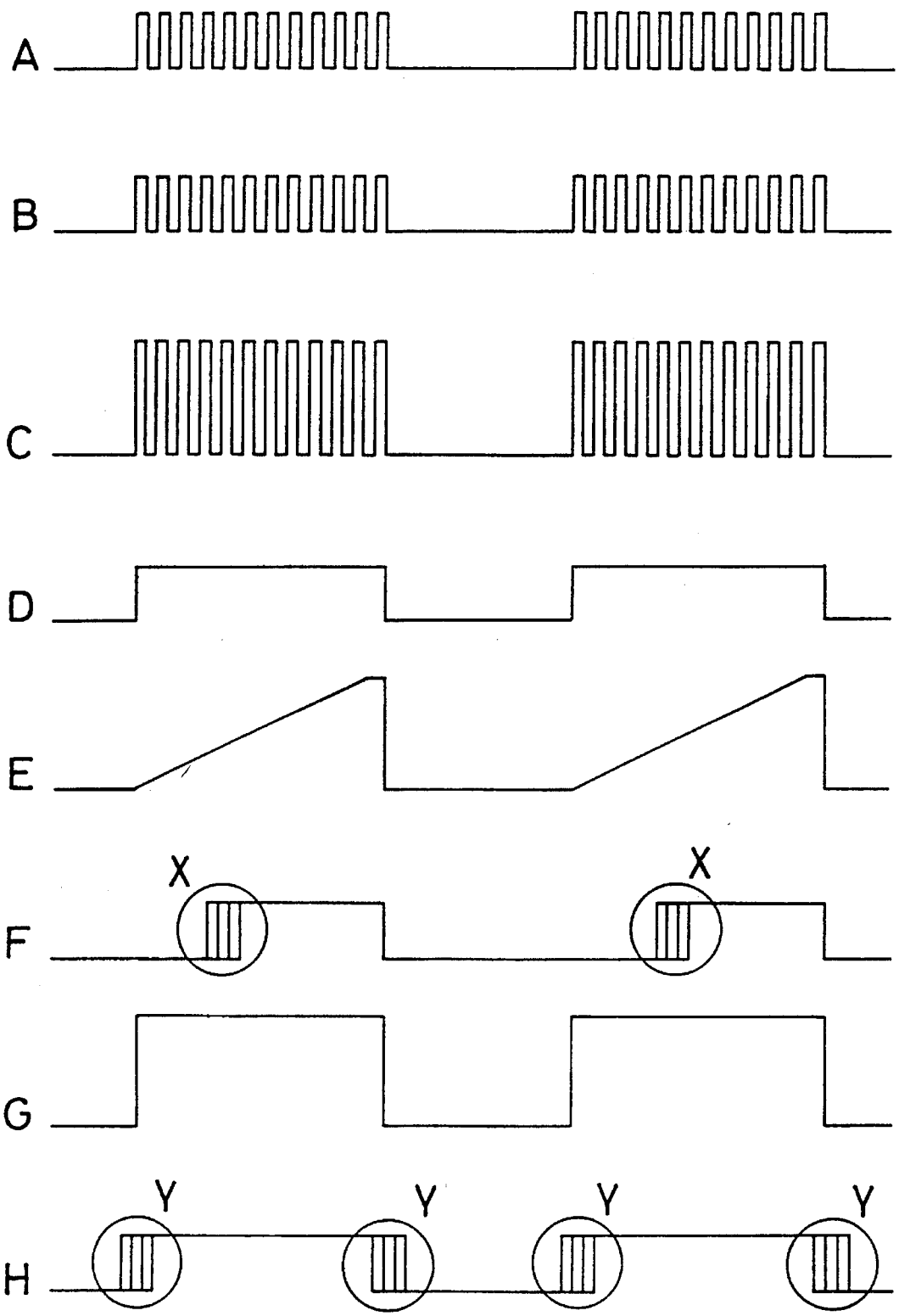
FIG. 8 shows waveforms at points A through H in FIG. 6 and FIG. 7.

The pulse signal, such as waveform A in FIG. 8, received by the signal receiving sensor 16a, as shown in FIG. 6, is a pulse signal including the carrier. This pulse signal has a weak and/or uneven intensity because it has been delivered through air in a relatively small amount of optical power. To adjust the level of the pulse signal uniformly, the pulse signal is provided to the AGC 25a. The level-adjusted waveform at the AGC 25a is shown as a waveform B in FIG. 8. Since this waveform still includes the carrier, it turns into the original pulse signal without carrier like a waveform D in FIG. 8 only after it passes by the envelope detector 26a. At this time, the envelope-detected signal from each of the envelope detector 26a to 26d is summing-amplified at the summing-amplifier 28. The summing-amplified signal from the summing-amplifier 28 is then applied again to each of the AGC 25a 25d to as a reference level for adjusting equally the gain of the pulse signal received by the signal receiving sensors 16a to 16d.

The comparator 27 performs a phase conversion with the envelope-detected signals from each envelope detector 26a to 26d and the triangular wave, see a waveform E in FIG. 8, from the triangular wave generator 29. The above-noted triangular wave is generated from the triangular wave generator 29 synchronized with the trigger signal from the trigger circuit 30 to achieve the phase conversion without error. The trigger signal is, at this time, provided from the summing-amplifier 28 in order that the phase of the trigger signal should be analogous to each summing-amplified signal from the summing-amplifier 28. The waveform of the phase-converted signal outputted from the comparator 27 is shown in FIG. 8 as waveform F.

Figure 9:
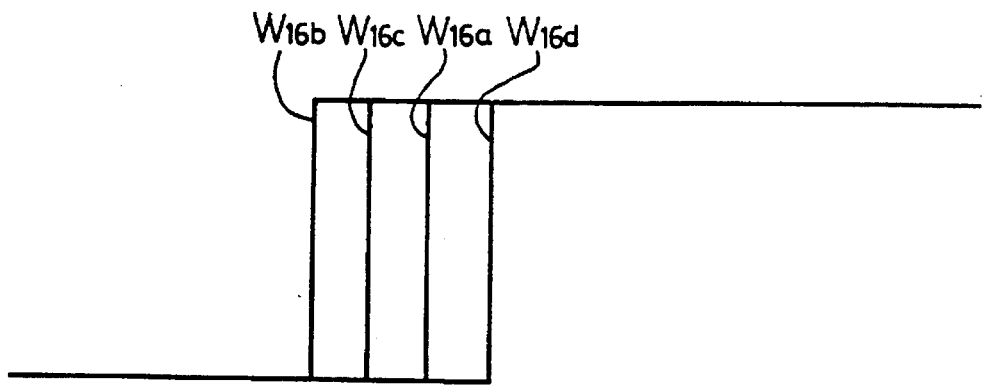
FIG. 9 is an enlarged view of the part X circled at FIG. 8.

FIG. 9 is an enlarged view of the part X circled on the waveform F in FIG. 8.

Each of the vertical block in FIG. 9 shows the phase differences of the phase-converted signals whose intensity differences are converted into the phase differences by the above-described operation. If the waveforms appear as waveforms shown in FIG. 9 according to four sensors 16a, 16b, 16c and 16d, the order of the intensities of the pulse signals received by each signal receiving sensor is W16d, W16a, W16c, and W16b in sequence. In conclusion, it is noticed that the transmitter 41 has pointed to the signal receiving sensor 16d.

The phase difference counter 31 counts the phase differences of the phase-converted signals with reference to the trigger signal from the trigger circuit 30 and applies count values to the coordinate calculator 32. The coordinate calculator 32 calculates the coordinate of the strongest signal, i.e., the closest signal receiving sensor from the transmitter 41, corresponding to the count values, and the controller 33 determines and displays thereby the point corresponding to the coordinate. A series of remote control process is now terminated according to the above process.

Figure 7:
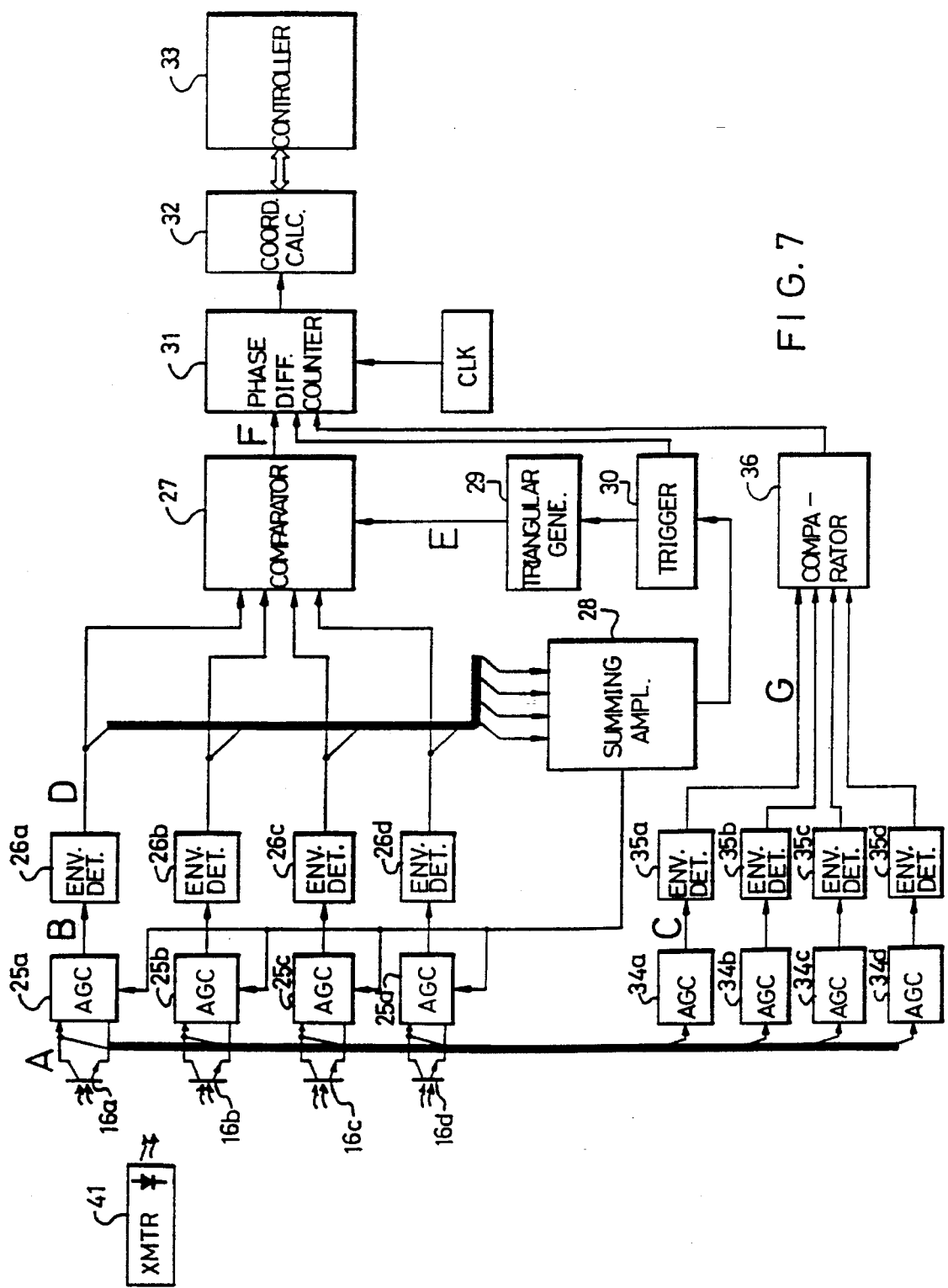
FIG. 7 is a block diagram of another preferred embodiment of the present invention.

FIG. 7 is a block diagram of another preferred embodiment of the point type remote control apparatus according to the present invention.

The apparatus embodied as FIG. 7 additionally comprises four AGCs 34a to 34d, which are connected with the AGCs 25a to 25d in parallel, for adjusting uniformly the levels of input pulse signals whose phases are different from one another due to the distance differences between the transmitter 41 and each signal receiving sensor, envelope detectors 35a to 35d for extracting the original pulse signals by removing the carrier from the outputs of the AGCs 34a to 35d, and a comparator 36 for comparing and duplicating the envelope-detected signals from each envelope detector 35a to 35d. Because the remaining sections are the same as the preferred embodiment in FIG. 6, they will not be explained.

The operation of the present invention, the point type remote control apparatus, according to another preferred embodiment will be explained with reference to FIG. 7 and FIGS. 8 to 10 as follows. Only the additional sections will be explained.

The pulse signals received by each signal receiving sensor 16a to 16d, whose phases are different from one another due to the distance differences between the transmitter 41 and each signal receiving sensor, are adjusted to bring their gains to the same level at the AGCs 34a to 34d. Of course, the pulse signals enter the AGCs 25a to 24d as well. These gain-adjusted pulse signals still include the carrier, and one is shown as a waveform C in FIG. 8.

The gain-adjusted signals whose gains have been adjusted by the AGCs 34a to 34d are extracted, see a waveform G in FIG. 8, into the original pulse signal transmitted from the transmitter 41 after the barriers are removed from the pulse signals by the envelope detectors 35a to 35d.

This extracted pulse signals are compared and duplicated by the comparator 36, and enter the phase difference counter 31 together with both the phase-converted signal from the comparator 27 explained in FIG. 6 and the trigger signal from the trigger circuit 30. The duplicated signals are, at this time, shown as a waveform H in FIG. 8. The waveform M is the waveform of the duplicated pulse signals whose phases are different from one another due to the distance differences between the transmitter 41 and the signal receiving sensors 16a to 16d.

Figure 10:
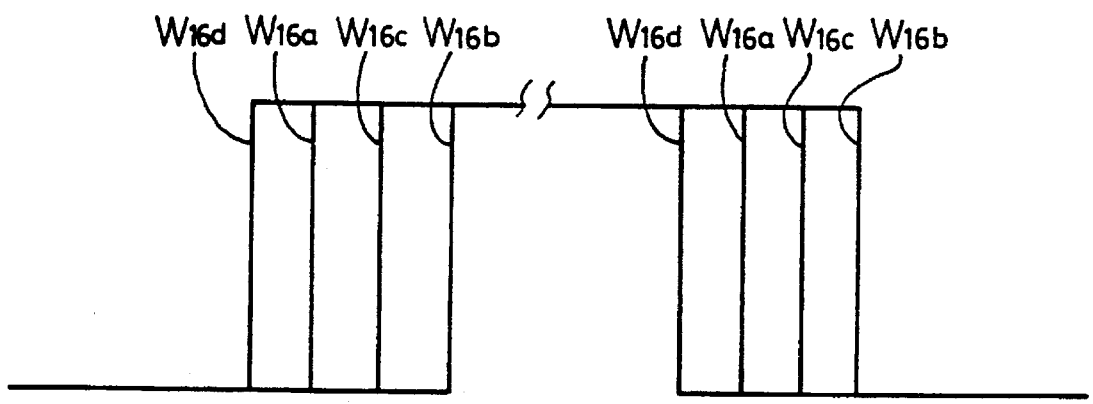
FIG. 10 is an enlarged view of the part Y circled at FIG. 8.

FIG. 10 is an enlarged view of the part Y circled on the waveform H in FIG. 8. When the waveforms appear as waveforms shown in FIG. 10 according to four sensors 16a, 16b, 16c and 16d, it is to be noted that the pulse signal W16d reaches first, W16a second, W16c third, and W16b last. In conclusion, it is noticed that the transmitter 41 has pointed to the signal receiving sensor 16d.

The phase differences of the duplicated pulse signals are counted at the phase difference counter 31, and thereafter the phase difference counter 31 makes count values corresponding the counted phase differences. The coordinate calculator 32 then calculates the coordinate corresponding to the most shifted phase, i.e., the closest signal receiving sensor from the transmitter 41. The controller 33 thereafter determines the point corresponding to the coordinate and displays the determination.

As a result, the present invention, the point type remote control apparatus according to another preferred embodiment calculates a more exact coordinate of the point by synthetically analyzing both of the phase differences: one is converted from the intensities of .the pulse signal received by the signal receiving sensors 16a to 16d as shown in FIG. 6, the other is compared and duplicates the pulse signals whose phases are different from one another due to the distance differences between the transmitter 41 and the signal receiving sensors 16a to 16d as shown in FIG. 7.

What is claimed is:

1. A point type remote control apparatus, which is for selecting a point existing on a display screen, comprising:

a transmitting means for transmitting a specified pulse signal towards a target point on the display screen;

a receiving means which includes a plurality of signal receiving sensor positioned around the display screen;

a signal processing means for performing a phase conversion according to the intensities of the pulse signals received by said signal receiving sensors by using a triangular wave synchronized with the signals received by said signal receiving sensors, and counting phase differences of the respective phase-converted pulse signals;

a coordinate calculating means for calculating a positional coordinate on the display screen corresponding to the most intensive pulse signal from the respective phase differences counted at said signal processing means; and a control means for recognizing the point on the display screen corresponding to the positional coordinate calculated by said coordinate calculating means, and displaying the fact of recognizing the point.

2. A point type remote control apparatus as claimed in claim 1, wherein said transmitting means comprises:

a switch;

a pulse signal generating means for generating a periodic pulse signal while said switch is being 'turned-on';

a carrier generating means for generating a carrier for modulating the pulse signal in order that the pulse signal can be transmitted into the air;

a current amplifying means for modulating the pulse signal from said pulse signal generating means with the carrier from said carrier generating means, and amplifying the modulated signal; and a signal transmitting element for transmitting the modulated signal from said current amplifying means into the air.

3. A point type remote control apparatus as claimed in claim 2, wherein said signal transmitting element is an infrared LED.

4. A point type remote control apparatus as claimed in claim 1, wherein said signal processing means comprises:

a plurality of automatic gain control means for adjusting uniformly the levels of the pulse signals received by the respective signal receiving sensors;

a plurality of envelope detecting means for extracting the pulse signal by removing the carrier from the outputs of each said automatic gain control means;

a summing-amplifying means for summing-amplifying an envelope-detected signals outputted from each said envelope detecting means, and applying the summing-amplified signal to each said automatic gain control means as a reference level;

a trigger means for generating a trigger signal synchronized with the summing-amplified signal from said summing-amplifying means;

a triangular wave generating means for generating a triangular wave synchronized with the trigger signal;

a comparing means for performing a phase conversion according to the intensities of the envelope-detected signals by comparing the respective envelope-detected signals with the triangular wave from said triangular wave generating means; and a phase difference counting means for counting phase differences of the phase-converted signals from said comparing means under the synchronization of said trigger means.

5. A point type remote control apparatus as claimed in claim 1, wherein said signal receiving sensors are positioned at two points around the display screen, and the point is thereby movable on a one-dimensional straight line.

6. A point type remote control apparatus as claimed in claim 1, wherein said signal receiving sensors are positioned at four corners of the display screen, and the point is thereby movable on a two-dimensional plane.

7. A point type remote control apparatus as claimed in claim 4, wherein said signal processing means additionally comprises:

a plurality of automatic gain controllers, respectively connected with said automatic gain control means in parallel, for adjusting uniformly the levels of the pulse signals received by said signal receiving sensors;

a plurality of envelope detectors for extracting the pulse signals by removing the carrier from the outputs of said respective automatic gain controllers; and a comparator for comparing and duplicating the envelope-detected signals from said envelope detectors and applying the duplicated signal to said phase difference counting means.

8. A point type remote control method which is for selecting a point existing on a display screen comprising the steps of:

(a) transmitting specified pulse signal towards a target point on the display screen;

(b) receiving the pulse signal respectively at several locations around the display screen;

(c) converting intensity differences of the received pulse signals into phase differences, and counting the phase differences of the phase-converted signals, (d) calculating a positional coordinate on the display screen corresponding to the most intensive pulse signal from the respective counted phase differences of the phase-converted signals;

(e) recognizing the point corresponding to the calculated positional coordinate and displaying the fact of recognizing the point;

(f) detecting real phase differences of the pulse signals based on differences in phase of each pulse signal;

(g) counting synthetically the phase differences of the phase-converted signal and the real phase differences; and (h) compensating for the positional coordinate calculated by said step (d) by using count values of said step (g).

* * * * *